No. 660,348. Patented Oct. 23, 1900.
J. TUCKER.
FLOOR CESSPOOL OR DRAIN.
(Application filed May 31, 1900.)
(No Model.)
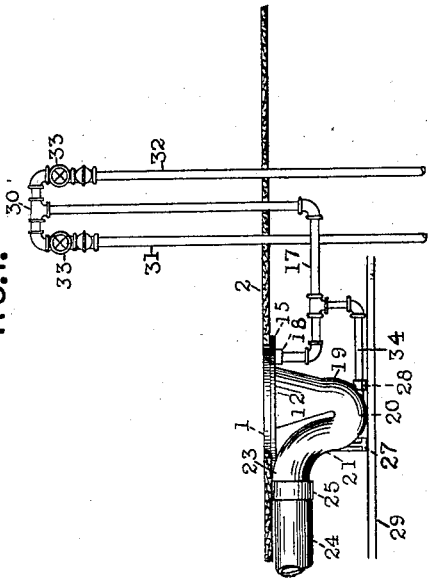
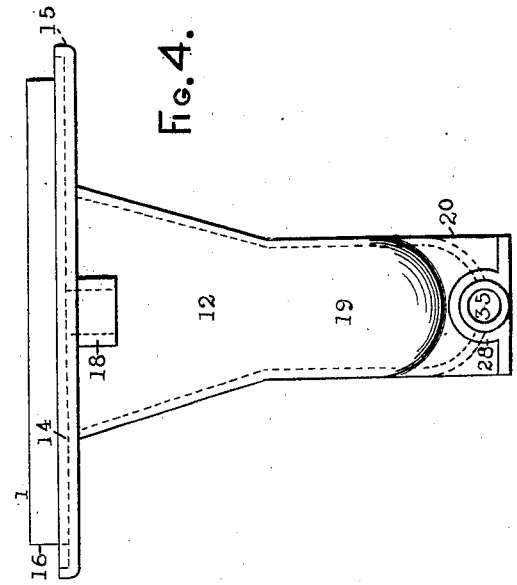
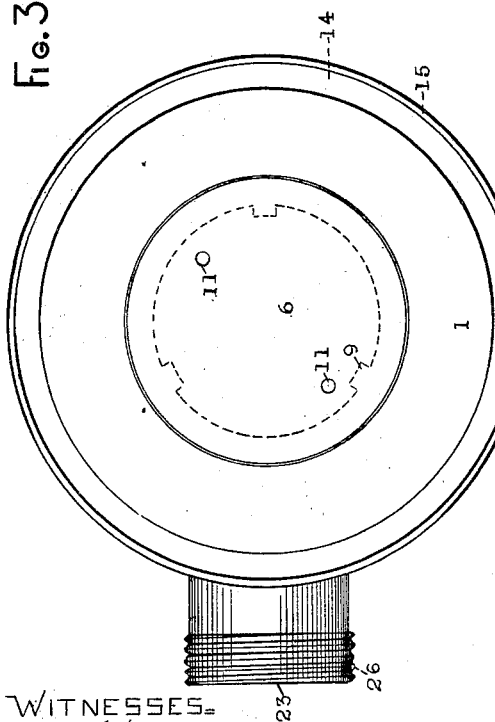
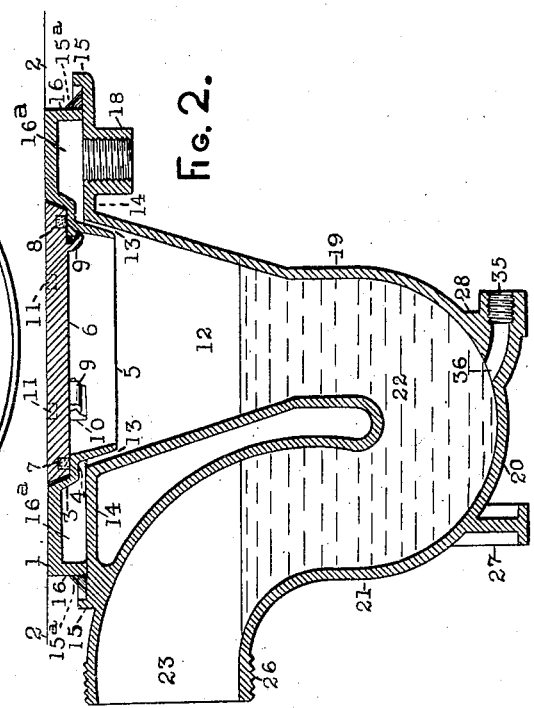
WITNESSES:
K. V. Donovan.
E. W. Wells.
INVENTOR:
John Tucker
by Jacob Felbel
His Attorney

UNITED STATES PATENT OFFICE.

JOHN TUCKER, OF NEW YORK, N. Y.

FLOOR CESSPOOL OR DRAIN.

SPECIFICATION forming part of Letters Patent No. 660,348, dated October 23, 1900.

Application filed May 31, 1900. Serial No. 18,492. (No model.)

*To all whom it may concern:*

Be it known that I, JOHN TUCKER, a citizen of the United States, and a resident of the borough of Manhattan, city of New York, in the county of New York and State of New York, have invented certain new and useful Improvements in Floor Cesspools or Drains, of which the following is a specification.

The object of my invention is to provide a novel, effective, and sanitary floor-cesspool or trap-like drain for use more especially in the operating-rooms of hospitals; and to this end the invention consists in certain combinations of devices and features of construction, all as will be more fully hereinafter set forth, and particularly pointed out in the appended claims.

In the accompanying drawings, Figure 1 is a side elevation of the trap arranged in position between the floor of a room and the ceiling of the room below and connected to supply and waste pipes. Fig. 2 is an enlarged sectional side elevation of the apparatus, but omitting the supply and waste pipes. Fig. 3 is an enlarged top plan, and Fig. 4 is an enlarged end elevation.

Throughout the several views similar parts are designated by similar numerals of reference.

The upper portion of the trap comprises an annular brass plate 1, which is placed substantially flush with the surface of the flooring 2 and is provided with an inner flange, which slopes downwardly and inwardly at 3, then extends horizontally inwardly at 4, and again downwardly and inwardly at 5. The horizontal or stepped portion 4 of the flange affords a seat for a metallic disk or cover 6, whose periphery is beveled to substantially fit the sloping portion 3 of the flange and whose under surface is provided with an annular recess 7, in which is placed a rubber gasket 8, which bears upon the horizontal step or seat 4. From the under side of the disk or cap 6 depend three wide hooks 9, which engage lugs 10, provided upon the lower or apron portion 5 of the said flange. The working or engaging faces of the hooks and lugs extend in a direction that is slightly inclined from the horizontal, so as to produce a downward wedging action upon the disk when it is given a slight rotation, and thus lock it firmly upon its seat. By the same operation the gasket 8 is subjected to pressure between the disk and the step 4, thus tightening the joint and effectually preventing the escape of any sewer-gas that might work up through the water seal (to be presently described) or that might permeate the trap in case the water seal should evaporate.

Upon the upper surface of the disk, which is substantially flush with the annular floor-plate 1 and which hence forms a continuation of the floor, are provided small circular depressions 11 to afford a bearing for a suitable key used to turn the cap 6 to lock and unlock it.

The depending flanged portion 5 opens downwardly into a cast brass funnel-shaped inlet 12, the diameter of whose upper end or mouth is somewhat greater than the diameter of said flange 5, so as to leave an annular space 13 between the inner surface of the inlet and the outer surface of the flange 5, which for its major portion extends downwardly within the mouth of said inlet. The upper or mouth end of the inlet is provided with a wide horizontal flange 14, preferably of greater diameter than the annular floor-plate 1, and having an upturned rim 15. The plate 1 has an integral downturned rim 16, which is secured upon the flange 14 by a brazed joint 15$^a$. The space thus formed between the floor-plate 1, the circular flange 14, the rim 16, and the flanges 3, 4, and 5 constitutes an annular water-chamber or flushing-rim 16$^a$, which opens into the annular space 13 between the flange 5 and the receiving end of the trap. A water-supply pipe 17 is connected to this chamber below the flooring 2 by means of an internally-threaded tubular boss 18, formed integrally with the flange 14 and projecting downwardly therefrom. The lower portion of the inlet is parallel sided in vertical section, and after extending downwardly a short distance at 19 is curved or bent at 20, and at 21 is directed upwardly and parallel with the portion 19. The said portions 12, 19, 20, and 21 contain a water seal 22. At its upper end the tube 21 is curved and directed horizontally outward at 23 and connected to a waste-pipe 24 by means of an annular internally-threaded coupling 25, which engages threads 26, extending around the outgo 23 and corresponding threads provided upon the end of the waste-pipe.

The structure is provided with two short legs 27 and 28, which terminate above the ceiling-line 29 and may rest upon any suitable support beneath the flooring. The rim 15 may take a bearing against the under surface of the floor 2, which may be of cement or tiling. The pipe 17 is connected at 30 to both a cold-water-supply pipe 31 and a hot-water-supply pipe 32, each of which latter is provided with a valve 33.

In operation the cap-plate 6, after being rotated sufficiently to enable the hooks to get clear of the lugs 10, is lifted from its seat. Then the blood and other matter upon the floor is swept and washed into the mouth of the trap. During or subsequent to this operation one (or both) of the valves 33 is opened and the water passes through pipe 17 into the annular chamber 16ª and then through the annular space 13 into the funnel 12, so as thoroughly to wash down the walls thereof. From the upper end of the trap the water passes through the bend 20 and the tube 21 into the waste-pipe, carrying along all the matter received from the floor and leaving the trap in a clean condition. Enough water remains in the bend 20, however, to make a seal and prevent a flow of sewer-gas from the waste-pipe into the room.

In order to dislodge or drive out substances which are large or heavy and liable to accumulate in the bend 20 and clog the passageway and perhaps cause an overflow from the trap upon the floor of the room, I connect a pipe 34 to the supply-pipe 17 and lead it below the flooring 2 to an opening 35, provided in the leg 28 of the trap, said opening extending inwardly and upwardly into the trap at 36 and preferably placed forward of a vertical line drawn through the middle of the bend of the trap, so as to direct a jet of water inwardly and upwardly in such a manner as to help drive off any and all matter that may be swept into the trap.

It will thus be seen that I have contrived a trap or floor-drain which is of simple construction and readily accessible and which effectually disposes of matter that may be washed into it. At the same time there is no danger of the contrivance becoming clogged and overflowing nor possibility of escape of sewer-gas into the room. Moreover, there are no corners or crevices into which blood and objectionable decaying matter may gather, and hence the device may at all times be kept clean and sanitary, since all the parts are thoroughly flushed and cleaned in the ordinary operation of the drain when the water-supply is turned on.

The structure is adapted to be fitted below the floor of a room and communicates with said floor and is connected up to a suitable source of water-supply, whereby the trap-like drain may be flushed and its contents driven out by a jet, while at the same time the mouth or inlet of the trap is constructed with a seat for a cap or cover which not only forms a continuation of the floor-line, but is adapted to prevent the escape of sewer gases or odors into the room.

Various changes in details of construction and arrangement may be resorted to within the scope of the invention. While I prefer to use both the flushing-rim and the jet 36 together, since the best results may be obtained by so doing, nevertheless, so far as some of my claims are concerned, I do not wish to be confined to the use in one structure of both the flushing-rim and the jet.

What I claim as new, and desire to secure by Letters Patent, is—

1. A floor-drain comprising, in combination, a floor-plate, a cover fitted therein, a trap arranged below said floor-plate and cover and extending first downwardly and then upwardly, a horizontal flange upon said trap, a downwardly-turned outer rim upon said floor-plate, the edge of said rim being firmly united to said horizontal flange, and the construction and arrangement being such that an annular chamber is left between said floor-plate and said flange, and means for supplying water to said annular chamber.

2. A floor-drain comprising, in combination, a floor-plate, an inner downwardly-extending stepped flange upon said plate, a cover substantially flush with the upper surface of said plate, and having a yielding packing upon its under side to rest upon said stepped flange, means for binding said cover in its seat so as to prevent the escape of gas, a trap arranged below said floor-plate and cover and constructed to contain a water seal, a horizontal flange upon said trap and attached to said floor-plate, the construction and arrangement being such that a chamber is formed between said floor-plate and said flange, and means for supplying water to said chamber.

3. A floor-drain comprising, in combination, a floor-plate, an inner downwardly-extending stepped flange upon said plate, a cover substantially flush with the upper surface of said plate and having an annular depression in its under side, a gasket arranged in said annular depression, hooks extending downwardly from said cover, lugs upon said flange adapted to engage said hooks, the working faces of said hooks and said lugs being inclined, a trap below said floor-plate and cover, a horizontal flange upon said trap, and attached to said floor-plate, the construction and arrangement being such that a chamber is formed between said floor-plate and said flange, and means for supplying water to said chamber.

4. A floor-drain comprising, in combination, floor-plate 1 having inner flanges 3, 4 and 5 and an outer rim 16, a trap having flange 14 to which the rim 16 is secured, water-supply inlet 18, and gas-tight cover 6.

5. A floor-drain comprising, in combination, a trap provided at its mouth with a floor-plate, a depressed seat, and an annular water-chamber, and bent at its lower portion to contain a water seal, a cover for said depressed seat, a water-supply for said annular water-chamber, a jet-opening at the bend of said trap, and a water-supply therefor.

6. A floor-drain comprising, in combination, floor-plate 1, cover 6 substantially flush therewith, a trap having flange 14 and rim 15, a flushing-chamber formed between the flange 14 and the floor-plate, and legs 27 and 28.

7. A floor-drain comprising, in combination, a trap, an integral floor-plate thereabove provided with an opening, a cap for said opening, a flushing-chamber between said floor-plate and the upper end of the trap, and a jet for the bend of the trap.

8. A floor-trap comprising, in combination, a flushing-rim, substantially level with the floor and having a seat, a removable cap fitting tightly in said seat, so as to prevent escape of gas from the trap, and an upwardly-directed jet-inlet at the lower end of the trap.

Signed in the borough of Manhattan, city of New York, in the county of New York and State of New York, this 29th day of May, A. D. 1900.

JOHN TUCKER.

Witnesses:
K. V. DONOVAN,
E. M. WELLS.